(12) United States Patent
Xin

(10) Patent No.: US 8,605,676 B2
(45) Date of Patent: Dec. 10, 2013

(54) METHOD AND DEVICE FOR CONFIGURING INTER-CELL TIME DIVISION DUPLEX MODES BASED ON A TDD SYSTEM

(75) Inventor: Yu Xin, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 246 days.

(21) Appl. No.: 12/918,059

(22) PCT Filed: Feb. 18, 2009

(86) PCT No.: PCT/CN2009/070461
§ 371 (c)(1),
(2), (4) Date: Oct. 31, 2010

(87) PCT Pub. No.: WO2009/103234
PCT Pub. Date: Aug. 27, 2009

(65) Prior Publication Data
US 2011/0032852 A1    Feb. 10, 2011

(30) Foreign Application Priority Data

Feb. 18, 2008  (CN) .......................... 2008 1 0009322
Apr. 3, 2008   (CN) .......................... 2008 1 0089851

(51) Int. Cl.
*H04W 4/00*     (2009.01)
(52) U.S. Cl.
USPC ............ 370/330; 370/329; 370/345; 370/442
(58) Field of Classification Search
None
See application file for complete search history.

(56) References Cited

U.S. PATENT DOCUMENTS

| | | | | |
|---|---|---|---|---|
| 6,859,655 B2* | 2/2005 | Struhsaker | | 455/450 |
| 7,890,113 B2* | 2/2011 | Jones et al. | | 455/447 |
| 8,209,576 B2* | 6/2012 | Zhang | | 714/748 |
| 8,233,413 B2* | 7/2012 | Zhang et al. | | 370/280 |
| 2002/0058513 A1* | 5/2002 | Klein et al. | | 455/447 |
| 2007/0081489 A1* | 4/2007 | Anderson et al. | | 370/329 |
| 2007/0087772 A1 | 4/2007 | Yi et al. | | |
| 2007/0147333 A1* | 6/2007 | Makhijani | | 370/347 |
| 2008/0107047 A1* | 5/2008 | Olfat | | 370/280 |
| 2008/0240072 A1* | 10/2008 | Bykovnikov | | 370/350 |
| 2010/0124183 A1* | 5/2010 | Sorond et al. | | 370/280 |
| 2012/0020258 A1* | 1/2012 | Linsky | | 370/280 |

FOREIGN PATENT DOCUMENTS

| | | |
|---|---|---|
| CN | 1568055 A | 1/2005 |
| CN | 1750702 A | 3/2006 |
| CN | 1925361 A | 3/2007 |

OTHER PUBLICATIONS

P.R. China, State Intellectual Property Office, International Search Report for International Application No. PCT/CN2009/070461, mailed Apr. 30, 2009.

* cited by examiner

*Primary Examiner* — Donald Mills
(74) *Attorney, Agent, or Firm* — Bright IP Law Offices

(57) ABSTRACT

The present invention disclose a method and a device for configuring inter-cell time division duplex modes based on a time division duplex system, wherein the method comprises: one or more physical frame pairs which are overlapped in the time domain and have different transmitting modes existing in physical frames of two adjacent cells; for each physical frame pair, setting one or two physical frames of the physical frame pair respectively not to transmit signals. With the technical schemes of the present invention, by means of making part or all of the physical frames overlapped in the time domain not to transmit signals, the uplink/downlink signal interference occurred when the ratios of the numbers of uplink/downlink physical frames between adjacent cells in the same frequency band is different may be avoided.

15 Claims, 12 Drawing Sheets

| configuration | | FL/RL ratio | S F P | physical frame index | | | | | | | | | | | | | | | | | | | | | | | |
|---|---|---|---|---|---|---|---|---|---|---|---|---|---|---|---|---|---|---|---|---|---|---|---|---|---|---|---|
| | | | | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 |
| 0 | standard | 1:1 | F | F | F | F | F | F | R | R | R | R | F | F | F | F | R | R | R | R | F | F | F | F | R | R | R | R |
| 1 | standard | 5:3 | F | F | F | F | F | F | F | R | R | R | F | F | F | F | F | R | R | R | F | F | F | F | F | R | R | R |
| 2 | standard | 3:1 | F | F | F | F | F | F | F | F | R | R | F | F | F | F | F | F | R | R | F | F | F | F | F | F | R | R |
| 3 | standard | 3:5 | F | F | F | F | F | R | R | R | R | F | F | F | R | R | R | R | F | F | F | R | R | R | R |
| 1:1 & 5:3 | MUTE | 4:3 | F | F | F | F | F | | R | R | R | F | F | F | F | | R | R | R | F | F | F | F | | R | R | R |
| 1:1 & 3:5 | MUTE | 3:4 | F | F | F | F | F | R | R | R | R | F | F | F | | R | R | R | R | F | F | F | | R | R | R | R |
| 5:3 & 3:1 | MUTE | 5:2 | F | F | F | F | F | F | | R | R | F | F | F | F | F | | R | R | F | F | F | F | F | | R | R |

Fig.8

METHOD AND DEVICE FOR CONFIGURING INTER-CELL TIME DIVISION DUPLEX MODES BASED ON A TDD SYSTEM

FIELD OF THE INVENTION

The present invention relates to communication field, and in particular to a method and a device for configuring inter-cell time division duplex modes based on a time division duplex (TDD) system.

BACKGROUND OF THE INVENTION

In a wireless system in which data is transmitted in the unit of superframe, the uplink/downlink of wireless air interface transmission transmits data generally in the unit of superframe; wherein each superframe is composed of one preamble and several PHY Frames (physical frames); in addition, both the preamble and the PHY Frame are composed by taking orthogonal frequency division multiplexing (OFDM) symbol as the basic unit.

The present ultra mobile broadband (UMB), long-term evolution (LTE), worldwide interoperability for microwave access (Wimax) system all have two duplex modes: the frequency division duplex (FDD) mode and the TDD mode.

In the FDD mode, the uplink/downlink uses different frequency band to transmit data; in this way, the resource allocations of uplink/downlink PHY Frames in the system are relatively independent, i.e., the resource allocation may be respectively performed to the downlink PHY Frames and the uplink PHY Frames.

In the TDD mode, since the uplink/downlink performs time division transmission in the same frequency band, the system may divide the PHY Frames into uplink physical frames and downlink physical frames based on a certain proportion according to the requirement of service. However, if the ratios of the numbers of the uplink/downlink PHY Frames of adjacent cells in the same frequency band are different, or the superframes of adjacent cells in the same frequency band do not align to each other, interference between adjacent cells will occur, and there exists also difficulty in networking.

SUMMARY OF THE INVENTION

The present invention is proposed in consideration that in the relative art a technology is needed to solve the problem that the interference between adjacent cells may be caused when the ratios of the numbers of the uplink/downlink PHY Frames between the adjacent cells in the same frequency band are different. Therefore, the present invention aims at providing a method and a device for eliminating the inter-cell interference to solve the above problem presented in the related art.

According to one aspect of the present invention, a method for configuring inter-cell time division duplex modes based on a time division duplex system is provided.

The method for configuring inter-cell time division duplex modes based on a time division duplex system according to the present invention comprises: one or more physical frame pairs which are overlapped in the time domain and have different transmitting modes exist in physical frames of two adjacent cells; for each physical frame pair, set only one physical frames of the physical frame pair not to transmit signals; in all the physical frame pairs, setting all uplink physical frames at a same location not to transmit signals, or setting all downlink physical frames at a same location not to transmit signals.

Wherein the head and the tail of the superframes in which physical frames of the two adjacent cells reside are aligned or not aligned.

Wherein the two adjacent cells are a cell using a TDD 5:3 mode and a cell using a TDD 4:4 mode; the fifth downlink physical frames of all the downlink transmission blocks of the cell using the TDD 5:3 mode are set not to transmit signals; or the first uplink physical frames of all the uplink transmission blocks of the cell using the TDD 4:4 mode are set not to transmit signals.

Wherein the two adjacent cells are a cell using a TDD 3:5 mode and a cell using a TDD 4:4 mode; the first uplink physical frames of all the uplink transmission blocks of the cell using the TDD 3:5 mode are set not to transmit signals; or the fourth downlink physical frames of all the downlink transmission blocks of the cell using the TDD 4:4 mode are set not to transmit signals.

Wherein the two adjacent cells are a cell using a TDD 6:2 mode and a cell using a TDD 4:4 mode; the sixth downlink physical frames of all the downlink transmission blocks of the cell using the TDD 6:2 mode and the first uplink physical frames of all the uplink transmission blocks of the cell using the TDD 4:4 mode are set not to transmit signals.

Wherein the two adjacent cells are a cell using a TDD 5:3 mode and a cell using a TDD 3:5 mode; the fifth downlink physical frames of all the downlink transmission blocks of the cell using the TDD 5:3 mode and the first uplink physical frames of all the uplink transmission blocks of the cell using the TDD 3:5 mode are set not to transmit signals.

Wherein the two adjacent cells are a cell using a TDD 5:3 mode and a cell using a TDD 6:2 mode; the first uplink physical frames of all the uplink transmission blocks of the cell using the TDD 5:3 mode or the sixth downlink physical frames of all the downlink transmission blocks of the cell with TDD 6:2 mode are set not to transmit signals.

Wherein the two adjacent cells are a cell using a TDD 6:2 mode and a cell using a TDD 3:5 mode; the sixth downlink physical frames of all the downlink transmission blocks of the cell using the TDD 6:2 mode and the first and the second uplink physical frames of all the uplink transmission blocks of the cell using the TDD 3:5 mode are set not to transmit signals.

Preferably, in the situation of setting an uplink physical frame not to transmit signals in an uplink transmission block, the same settings are performed to the uplink physical frames at the same location in other uplink transmission blocks; in the situation of setting a downlink physical frame not to transmit signals in a downlink transmission block, the same settings are performed to the downlink physical frames at the same location in other downlink transmission blocks.

Preferably, when areas using different time division duplex modes are adjacent, one or more cell of the time division duplex mode with physical frames which do not transmit signals is used to divide the areas using different time division duplex modes.

Wherein the lengths of the superframes in which physical frames of the two adjacent cells reside are identical or different in the situation that the lengths of the superframes in which the physical frames of the two adjacent cells reside are identical, the physical frame pair is determined by aligning the head and the tail of the superframes of the two adjacent cells in the time domain.

According to one aspect of the present invention, a method for configuring inter-cell time division duplex modes based on a time division duplex system is provided, and the method is used to eliminate the uplink/downlink signal interference between more than two adjacent cells with different ratios of the numbers of uplink/downlink physical frames in the same frequency band.

The method for configuring inter-cell time division duplex modes based on a time division duplex system according to the present invention comprises: one or more physical frame groups which are overlapped in the time domain and have different transmitting modes exist in the physical frames of the more than two adjacent cells; for each physical frame group, set all the uplink physical frames or all the downlink physical frames in the physical frame group respectively not to transmit signals; in all the physical frame groups, setting all the uplink physical frames in the physical frame groups at a same location not to transmit signals, or setting all the downlink physical frames in the physical frame groups at a same location not to transmit signals.

Wherein the lengths of the superframes in which the physical frames of the more than two adjacent cells reside are identical or different in the situation that the lengths of the superframes in which the physical frames of the more than two adjacent cells reside are identical, the physical frame group is determined by aligning the heads and the tails of the superframes of various adjacent cells in the time domain.

Wherein in the situation of setting an uplink physical frame not to transmit signals in an uplink transmission block, the same settings are performed to the uplink physical frames at the same location in other uplink transmission blocks; in the situation of setting a downlink physical frame not to transmit signals in a downlink transmission block, the same settings are performed to the downlink physical frames at the same location in other downlink transmission blocks.

According to one aspect of the present invention, a method for configuring inter-cell time division duplex modes based on a time division duplex system is provided, and the method is used to eliminate the uplink/downlink signal interference between multiple adjacent cells, of which the head and tail of the superframes in the same frequency band are not aligned.

The method for configuring inter-cell time division duplex modes based on a time division duplex system according to the present invention comprises: one or more physical frame groups which are overlapped in the time domain and have different transmitting modes exist in the physical frames of the multiple adjacent cells; for each physical frame group, set all the uplink physical frames or all the downlink physical frames in the physical frame group respectively not to transmit signals; in all the physical frame groups, setting all the uplink physical frames in the physical frame groups at a same location not to transmit signals, or setting all the downlink physical frames in the physical frame groups at a same location not to transmit signals.

Wherein the ratios of the numbers of the uplink/downlink physical frames between the multiple adjacent cells are identical, or the ratios of the numbers of the uplink/downlink physical frames between the multiple adjacent cells are different.

Wherein in the situation of setting an uplink physical frame not to transmit signals in an uplink transmission block, the same settings are performed to the uplink physical frames at the same location in other uplink transmission blocks; in the situation of setting a downlink physical frame not to transmit signals in a downlink transmission block, the same settings are performed to the downlink physical frames at the same location in other downlink transmission blocks.

According to another aspect of the present invention, a device for configuring inter-cell time division duplex modes based on a time division duplex system is provided, and the device is used to eliminate the uplink/downlink signal interference between multiple adjacent cells in the same frequency band.

The device for configuring inter-cell time division duplex modes based on a time division duplex system according to the present invention comprises: a determining module, configured to determine that one or more physical frame groups which are overlapped in the time domain and have different transmitting modes exist in physical frames of the multiple adjacent cells; a setting module, configured to set, in all the physical frame groups, all the uplink physical frames in the physical frame groups at a same location not to transmit signals or all the downlink physical frames in the physical frame groups at a same location not to transmit signals.

Wherein in the situation of setting an uplink physical frame not to transmit signals in an uplink transmission block, the same settings are performed to the uplink physical frames at the same location in other uplink transmission blocks; in the situation of setting a downlink physical frame not to transmit signals in a downlink transmission block, the same settings are performed to the downlink physical frames at the same location in other downlink transmission blocks.

With the above one or more technical schemes provided by the present invention, by means of making part or all of the physical frames overlapped in the time domain not to transmit signals, comparing with the relative art, the uplink/downlink signal interference occurred when the ratios of the numbers of uplink/downlink physical frames between adjacent cells in the same frequency band is different may be avoided, the uplink/downlink signal interference caused by the non-alignment of the head and tail of the superframes of the adjacent cells in the same frequency band may also be avoided, and the networking problem is solved.

Other features and advantages of the present invention will be described in the following specification and partly apparent therefrom, or understood by implementing the present invention. The objects and other advantages of the present invention will be realized and obtained through the structures specially defined in the specification, claims and drawings.

BRIEF DESCRIPTION OF THE DRAWINGS

The accompanying drawings are used to provide a further understanding of the present invention and form a part of the specification, the accompanying drawings is used to explain the present invention together with the embodiments of the present invention without unduly limiting the scope of the present invention, wherein:

FIG. 8 is a schematic diagram of the seven configuration situation needed to be processed by the whole UMB TDD network system according to a method embodiment of the present invention;

DETAILED DESCRIPTION OF THE INVENTION

Function Overview

As described above, in the time division duplex (TDD) mode, the uplink/downlink performs data transmission in the same frequency band at different time. Since it is different from the frequency division duplex (FDD) mode, in which the uplink/downlink transmits data using different frequency bands, it is possible to allocate resources to the downlink PHY Frames and the uplink PHY Frames respectively when the resources is to be allocated to the uplink/downlink PHY Frames of the system. In this way, in the TDD mode, on one hand, when the ratios of the numbers of the uplink/downlink physical frames between adjacent cells in the same frequency band are different, interference between adjacent cells may be caused; on the other hand, in the situation that the superframes of adjacent cells in the same frequency band are not aligned, interference between adjacent cells may also be caused. In such a case, how the system should process is a key problem in the networking process.

In view of the above, the embodiments of the present invention provide a method and device for eliminating the inter-cell interference based on the TDD system.

In the situation that there is no conflict, the embodiments of the present application and the features of the embodiments may be combined with each other.

The preferred embodiments of the present invention will be described hereinafter in conjunction with the drawings thereof. What should be understood is that the preferred embodiments described herein are used to explain the present invention without unduly limiting the scope of the present invention.

Method Embodiment One

According to an embodiment of the present invention, a method for configuring inter-cell time division duplex modes based on a TDD system is provided, which is used to eliminate the uplink/downlink signal interference between two adjacent cells with different ratios of the numbers of uplink/downlink physical frames in the same frequency band.

Figure 1:
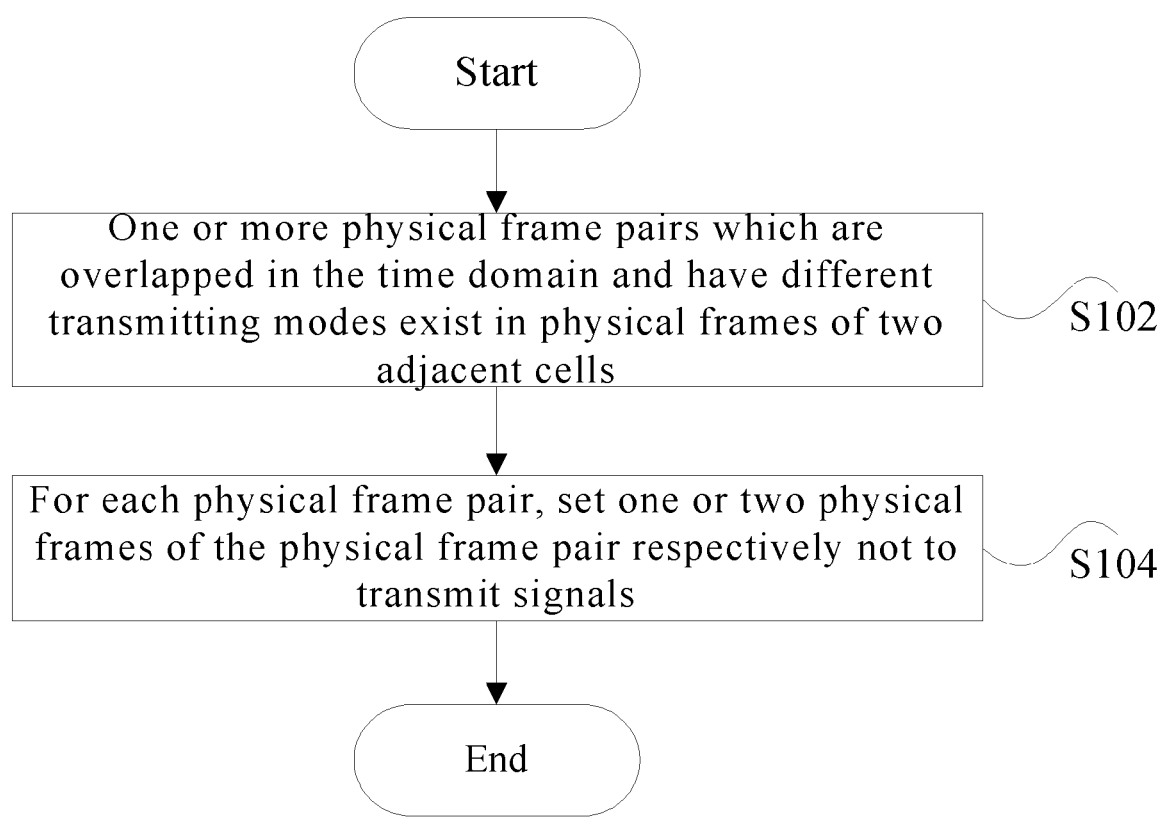
FIG. 1 is a flowchart of the method for configuring inter-cell time division duplex modes based on a TDD system according to method embodiment one of the present invention.

As shown in FIG. 1, the method for configuring inter-cell time division duplex modes based on a TDD system according to the embodiment of the present invention includes the following processing. (step S102 to step S104).

Step S102, one or more physical frame pairs which are overlapped in the time domain and have different transmitting modes exist in physical frames of two adjacent cells.

What should be noted is that in the present invention, the different transmitting modes refers to that the transmitting directions are different; the transmitting direction is one of the following: uplink transmitting and downlink transmitting; wherein the physical frame pair is defined as: two physical frames that are overlapped in the time domain and have different transmitting modes, which is called physical frame pair; the overlapping in the time domain described herein may be that the two physical frames are overlapped partially in the time domain, and two physical frames may be overlapped completely.

Step S104, for each physical frame pair, set one or two physical frames of the physical frame pair respectively not to transmit signals, i.e., for each physical frame pair, set an uplink physical frame or a downlink physical frame in the physical frame pair respectively not to transmit signals; in the present text, the "the PHY Frame which does not transmit signals" is called Mute PHY Frame; in this way, the signal interference between the uplink and the downlink is avoided.

Wherein the lengths of the superframes in which physical frames of the above two adjacent cells reside may be identical or different. Moreover, in the situation that the lengths of the superframes are identical, the physical frame pair is determined by aligning the head and the tail of the superframes of the two adjacent cells in the time domain.

In addition, in all the physical frame pairs determined, the uplink physical frames at the same location in all uplink transmission blocks may be set not to transmit signals, or the downlink physical frames at the same location in all downlink transmission blocks are set not to transmit signals. In other words, in the situation of setting an uplink physical frame not to transmit signals in an uplink transmission block, the same settings are performed to the uplink physical frames at the same location in other uplink transmission blocks; in the situation of setting a downlink physical frame not to transmit signals in a downlink transmission block, the same settings are performed to the downlink physical frames at the same location in other downlink transmission blocks. Moreover, the uplink physical frames at the same location in all the uplink transmission blocks and the downlink physical frames at the same location in all the downlink transmission blocks are set not to transmit signals at the same time.

With the above technical schemes, by means of making part or all of the physical frames overlapped in the time domain not to transmit signals, the uplink/downlink signal interference may be avoided when the ratios of the numbers of uplink/downlink physical frames between adjacent cells in the same frequency band is different.

There may be many situations of TDD modes used by the adjacent cells, and the technical schemes provided by the embodiments of the present invention will be described hereinafter in conjunction with the detailed embodiments. To simplify the description, in the following embodiments, in the situation that the ratios of the number of the uplink/downlink PHY Frames of two adjacent cells are different, assume that the lengths of the superframes in the system are identical.

Embodiment 1

A TDD 4:4 Cell is Adjacent to a TDD 5:3 Cell

Figure 2:
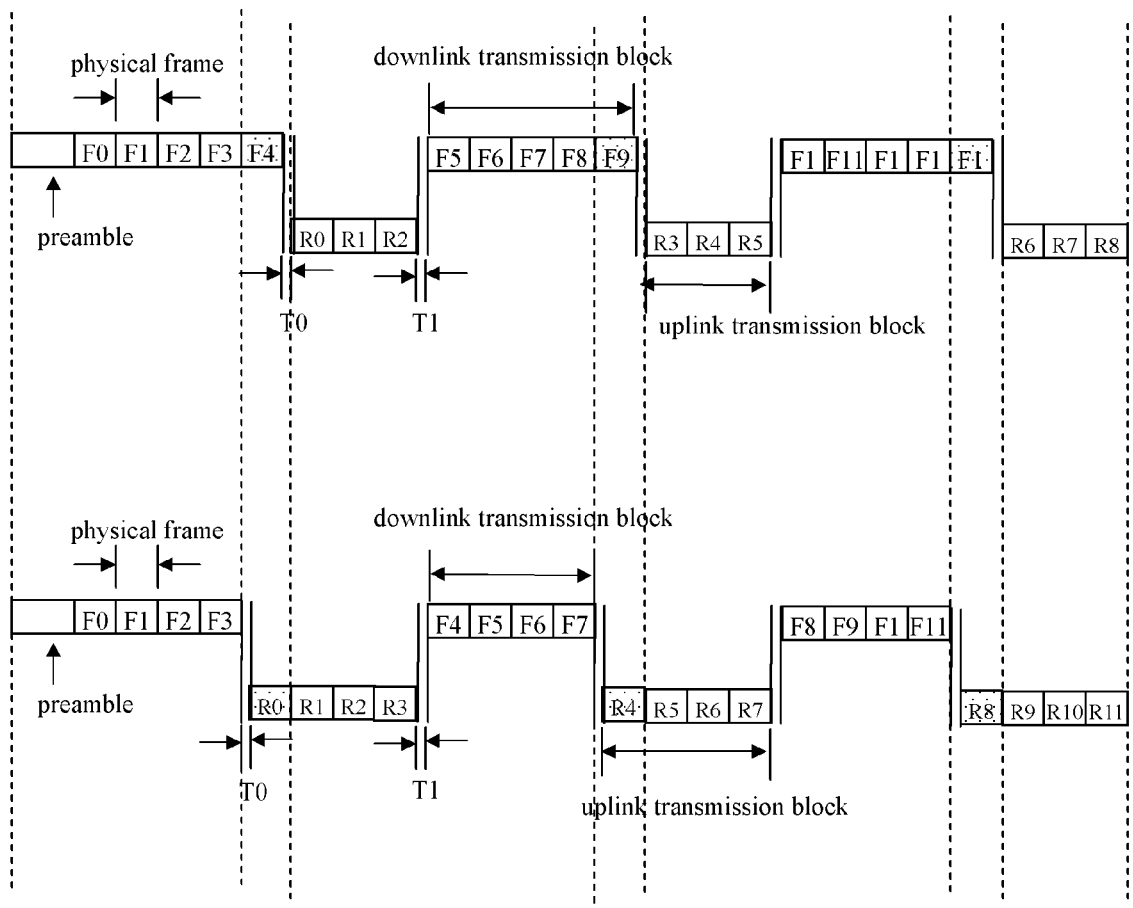
FIG. 2 is a schematic diagram of situation for setting the Mute PHY Frame when a TDD 4:4 cell is adjacent to a TDD 5:3 cell according to embodiment 1 of the method as shown in FIG. 1.

FIG. 2 is a schematic diagram of the situation for setting the Mute PHY Frame when a TDD 4:4 cell is adjacent to a TDD 5:3 cell according to embodiment 1 of the method, wherein the two adjacent cells are a cell using the TDD 5:3 mode and a cell using the TDD 4:4 mode. As shown in FIG. 2, the first physical frame of a TDD 4:4 uplink transmission block overlaps with the fifth physical frame of a TDD 5:3 downlink transmission block.

For the TDD 5:3 mode, a superframe includes a preamble and 24 PHY Frames. In particular, a superframe includes the following in sequence: a preamble, a downlink transmission block composed of 5 consecutive downlink physical frames, a first time interval, an uplink transmission block composed of 3 consecutive uplink physical frames, a second time interval, another downlink transmission block composed of 5 consecutive downlink physical frames, a third time interval, another uplink transmission block composed of 3 consecutive uplink physical frames, a fourth time interval, another downlink transmission block composed of 5 consecutive downlink physical frames, a fifth time interval, and another uplink transmission block composed of 3 consecutive uplink physical frames.

For the TDD 4:4 mode, a superframe includes a preamble and 24 PHY Frames. In particular, a superframe includes the following in sequence: a preamble, a downlink transmission block composed of 4 consecutive downlink physical frames, a first time interval, an uplink transmission block composed of 4 consecutive uplink physical frames, a second time interval, another downlink transmission block composed of 4 consecutive downlink physical frames, a third time interval, another uplink transmission block composed of 4 consecutive uplink physical frames, a fourth time interval, another downlink transmission block composed of 4 consecutive downlink physical frames, a fifth time interval, and another uplink transmission block composed of 4 consecutive uplink physical frames.

The lengths of the superframes of the above two TDD Modes are identical, and the head and the tail of the superframes are aligned in the time domain.

As shown in FIG. 2, in a superframe, F4, F9 and F14 of the downlink PHY Frame in the TDD 5:3 mode respectively overlap with R0, R4 and R8 of the uplink PHY Frame in the TDD 4:4 mode in the time domain; in this case, there is interference between the downlink signals of the TDD 5:3 mode and the uplink signals of the TDD 4:4 mode.

In the embodiment of the present invention, the F4 physical frame of the TDD 5:3 mode or the R0 physical frame of the TDD 4:4 mode may be set not to transmit signals; in particular, if the F4 physical frame of the TDD 5:3 mode is set not to transmit signals, the R0 physical frame of the TDD 4:4 mode may transmit signals or not transmit signals; if the R0 physical frame of the TDD 4:4 mode is set not to transmit signals, the F4 physical frame of the TDD 5:3 mode may transmit signals or not transmit signals; to sum up, the F4 physical frame of the TDD 5:3 mode and the R0 physical frame of the TDD 4:4 mode can not transmit signals at the same time. In other words, in the embodiment of the present invention, the F4 physical frame of the TDD 5:3 mode or the R0 physical frame of the TDD 4:4 mode is made to use the Mute PHY Frame mode. In this way, there is no signal interference between the F4 physical frame of the TDD 5:3 mode and the R0 physical frame of the TDD 4:4 mode. i.e., to eliminate the interference, for these two overlapped physical frames, the fifth downlink physical frame of an downlink transmission block of the cell using the TDD 5:3 mode may be set not to transmit signals (i.e., setting it as the Mute PHY Frame, that is to say, setting a physical frame as the Mute PHY Frame means signals are not transmitted on the physical frame); or the first uplink physical frame of an uplink transmission block of the cell using the TDD 4:4 mode is set not to transmit signals; or the fifth downlink physical frame of the downlink transmission block of the cell using the TDD 5:3 mode and the first uplink physical frame of the uplink transmission block of the cell using the TDD 4:4 mode are set not to transmit signals at the same time.

For the same reason, to avoid interference, the F9 physical frame of the TDD 5:3 mode or the R4 physical frame of the TDD 4:4 does not transmit signals; and/or the F14 physical frame of the TDD 5:3 mode or the R8 physical frame of TDD 4:4 does not transmit signals.

The present invention may also applicable to the situation that the lengths of the superframes of the two adjacent cells are different. i.e., as long as an uplink physical frame is overlapped with a downlink physical frame in the time domain, one of them is set to use the Mute PHY Frame mode.

In this embodiment, preferably, to simplify the operation process of the system, the first physical frames of all the uplink transmission blocks of the TDD 4:4 may be set as the Mute PHY Frame, or the fifth physical frames of all the downlink transmission blocks of the TDD 5:3 are set as the Mute PHY Frame. In this way, the TDD 4:4 mode is similar to the TDD 4:3 mode; or the TDD 5:3 mode is similar to the TDD 4:3 mode. In this way, there is a transmission mode of the TDD 4:3 in the system, the system only adds the process of one transmission mode of the TDD 4:3 and the complexity of system processing is reduced.

The TDD 4:4 mode is similar to the TDD 4:3 mode; the numbers of the physical frames of the downlink transmission blocks of the TDD 4:4 and the TDD 4:3 are the same, and the difference of the numbers of the physical frames of uplink transmission blocks is one; the TDD 5:3 mode is similar to the TDD 4:3 mode; the numbers of the physical frames of the uplink transmission blocks of the TDD 4:3 and the TDD 5:3 are the same, and the difference of the numbers of the physical frames of downlink transmission blocks is one. In this way, when different time division duplex modes are used for networking in the adjacent area, the difference between the TDD modes used by the adjacent areas may be made to be minimal.

With this embodiment, the cell interference may be eliminated when the TDD 4:4 cell is adjacent to the TDD 5:3 cell.

Embodiment 2

A TDD 4:4 Cell is Adjacent to a TDD 3:5 Cell

Figure 3:
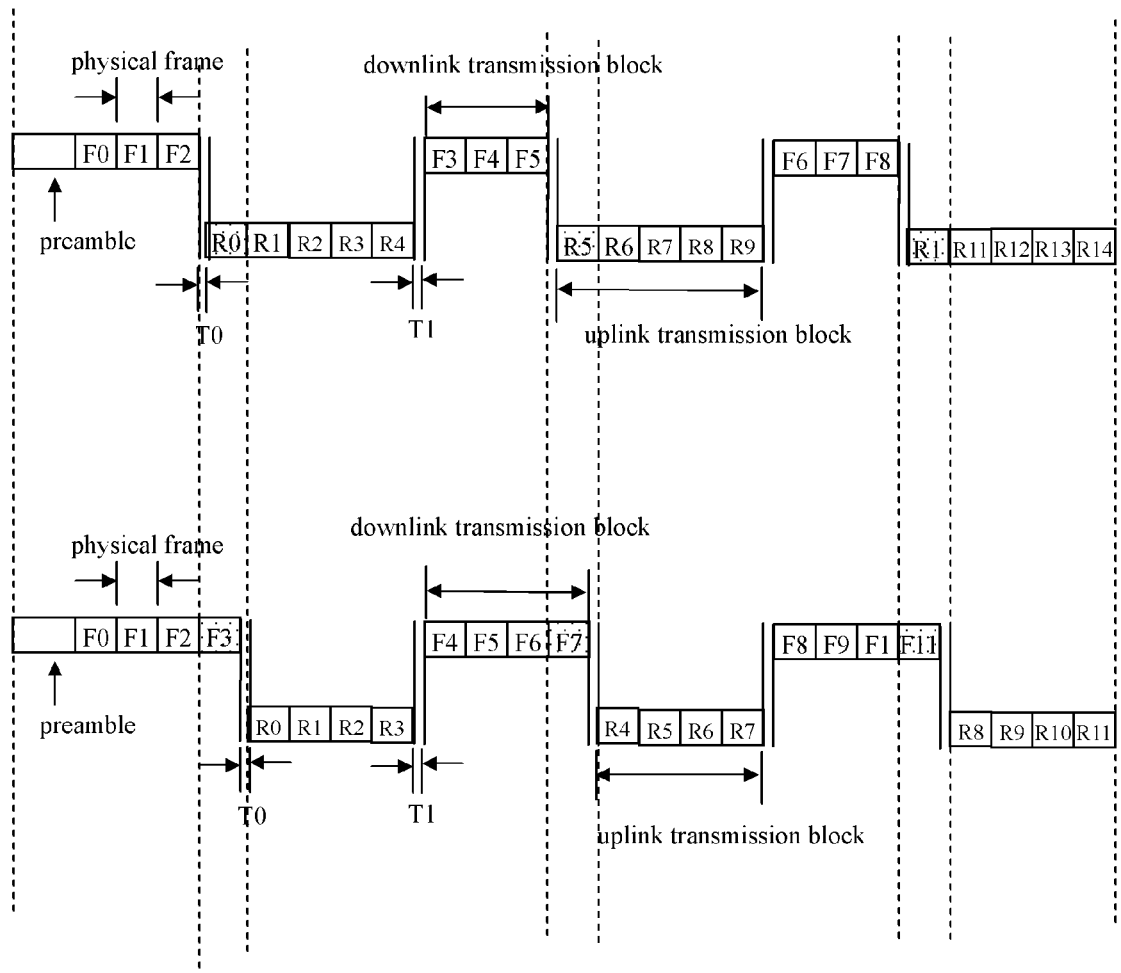
FIG. 3 is a schematic diagram of situation for setting the Mute PHY Frame when a TDD 4:4 cell is adjacent to a TDD 3:5 cell according to embodiment 2 of the method as shown in FIG. 1.

FIG. 3 is a schematic diagram of situation for setting the Mute PHY Frame when a TDD 4:4 cell is adjacent to a TDD 3:5 cell according to embodiment 2 of the method, wherein the two adjacent cells are a cell using TDD 3:5 mode and a cell using TDD 4:4 mode. As shown in FIG. 3, the fourth physical frame of the TDD 4:4 downlink transmission block overlaps with the first physical frame of the TDD 3:5 uplink transmission block.

In this situation, to eliminate the interference, for these two overlapped physical frames, the first uplink physical frame of the uplink transmission block of the cell using the TDD 3:5 mode is set not to transmit signals; or the fourth downlink physical frame of the downlink transmission block of the cell using the TDD 4:4 mode is set not to transmit signals; or the first uplink physical frame of the uplink transmission block of the cell using the TDD 3:5 mode and the fourth downlink physical frames of all the downlink transmission blocks of cells using the TDD 4:4 mode are set not to transmit signals at the same time.

Preferably, the fourth physical frame of all the downlink transmission blocks of the TDD 4:4 may be set as the Mute PHY Frame, or the first physical frames of all the uplink transmission blocks of the TDD 3:5 are set as the Mute PHY Frame. In this way, one transmission mode of the TDD 3:4 appears, the system only adds the process of one transmission mode of the TDD 3:4, and the complexity of system process is reduced.

In particular, for the TDD 3:5 mode, a superframe includes a preamble and 24 PHY Frames, which is as shown in FIG. 3. In particular, a superframe includes the following in sequence: a preamble, a downlink transmission block composed of 3 consecutive downlink physical frames, a first time interval, an uplink transmission block composed of 5 consecutive uplink physical frames, a second time interval, another downlink transmission block composed of 3 consecutive downlink physical frames, a third time interval, another uplink transmission block composed of 5 consecutive uplink physical frames, a fourth time interval, another downlink transmission block composed of 3 consecutive downlink physical frames, a fifth time interval, and another uplink transmission block composed of 5 consecutive uplink physical frames.

For the TDD 4:4 mode, a superframe includes a preamble and 24 PHY Frames, which is as shown in FIG. 3. In particular, a superframe includes the following in sequence: a preamble, a downlink transmission block composed of 4 consecutive downlink physical frames, a first time interval, an uplink transmission block composed of 4 consecutive uplink physical frames, a second time interval, another downlink transmission block composed of 4 consecutive downlink physical frames, a third time interval, another uplink transmission block composed of 4 consecutive uplink physical frames, a fourth time interval, another downlink transmission block composed of 4 consecutive downlink physical frames, a fifth time interval, and another uplink transmission block composed of 4 consecutive uplink physical frames.

The lengths of the superframes of these two TDD Modes are identical, and the head and the tail of the superframe are aligned in the time domain.

As shown in FIG. 3, in a superframe, R0, R5 and R10 of the uplink PHY Frame in the TDD 3:5 mode respectively overlap with F3, F7 and F11 of the downlink PHY Frame in the TDD 4:4 mode; in this way, there is interference between the uplink signals of the TDD 3:5 mode and the downlink signals of the TDD 4:4 mode.

To avoid the interference, the R0 physical frame of the TDD 3:5 mode or the F3 physical frame of the TDD 4:4 do not transmit signals; i.e., if the R0 physical frame of the TDD 3:5 mode does not transmit signals, the F3 physical frame of the TDD 4:4 mode may transmit signals or may not transmit signals; if the F3 physical frame of the TDD 4:4 mode does not transmit signals, the R0 physical frame of the TDD 3:5 mode may transmit signals or may not transmit signals; to sum up, the R0 physical frame of the TDD 3:5 mode and the F3 physical frame of the TDD 4:4 mode can not transmit signals at the same time. In other words, the R0 physical frame of the TDD 3:5 mode or the F3 physical frame of the TDD 4:4 mode is made to use the mode of the Mute PHY Frame. In this way, there is no signal interference between the R0 physical frame of the TDD 3:5 mode and the F3 physical frame of the TDD 4:4 mode.

For the same reason, to avoid the interference, the R5 physical frame of the TDD 3:5 mode or the F7 physical frame of the TDD 4:4 may be made to not transmit signals; and/or the R10 physical frame of the TDD 3:5 mode or the F11 physical frame of the TDD 4:4 is made to not transmit signals.

Preferably, to simplify the operation process of the system, the fourth physical frames of all the downlink transmission blocks of the TDD 4:4 may be set as the Mute PHY Frame, or the first physical frames of all the uplink transmission blocks of the TDD 3:5 are set as the Mute PHY Frame. i.e., as shown in FIG. 3, the physical frames F3, F7 and F11 of the TDD 4:4 are all set as the Mute PHY Frame; or the physical frames R0, R5 and R10 of the TDD 3:5 are all set as the Mute PHY Frame. In this way, the TDD 4:4 mode is similar to the TDD 3:4 mode; or the TDD 3:5 mode is similar to the TDD 3:4 mode. In this way, one transmission mode of the TDD 3:4 appears in the system, the system only adds the process of one transmission mode of the TDD 3:4, and the complexity of system processing is reduced.

With this embodiment, the cell interference may be eliminated when the TDD 4:4 cell is adjacent to the TDD 3:5 cell.

Embodiment 3

A TDD 4:4 Cell is Adjacent to a TDD 6:2 Cell

Figure 4:
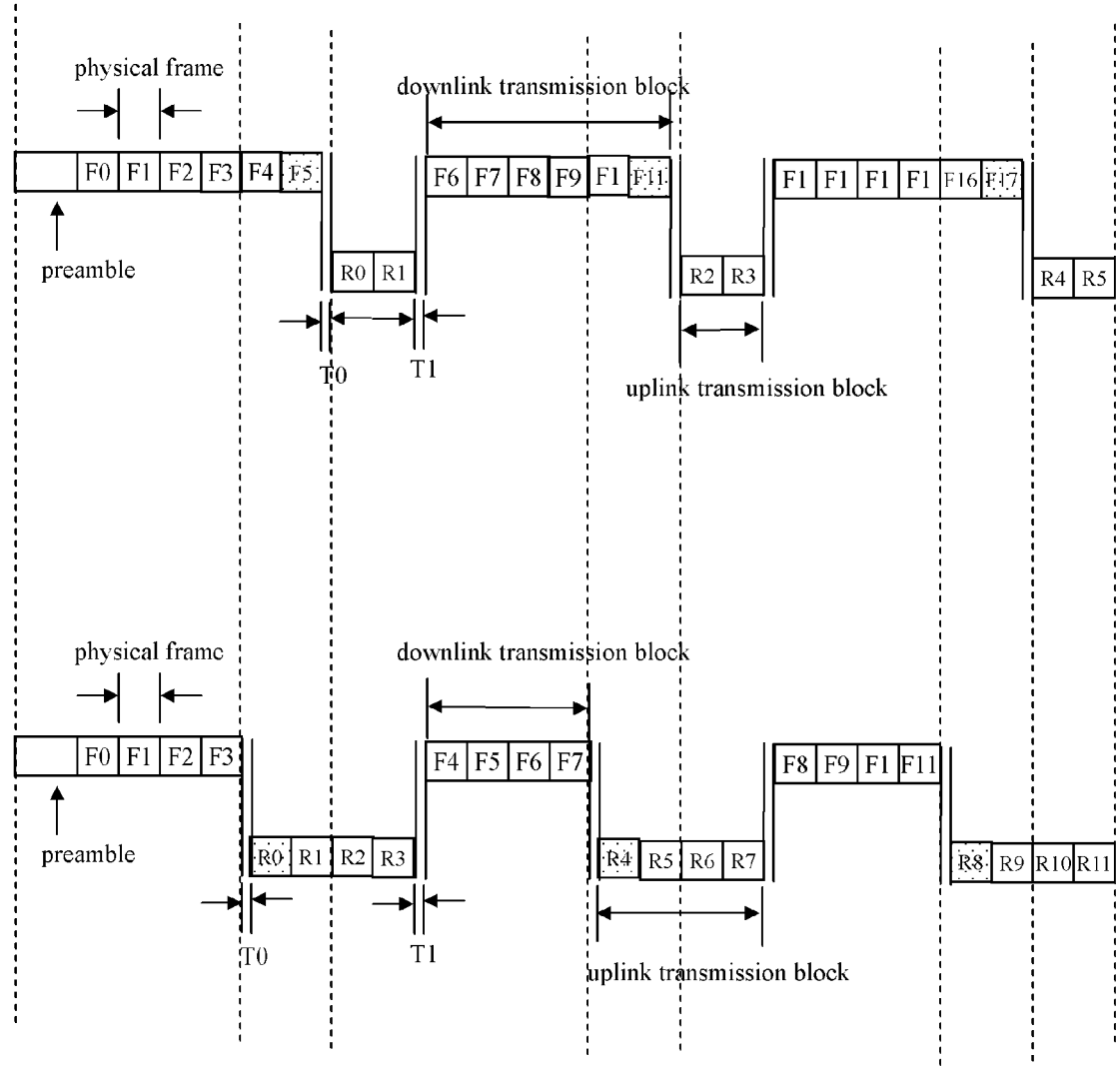
FIG. 4 is a schematic diagram of situation for setting the Mute PHY Frame when a TDD 4:4 cell is adjacent to a TDD 6:2 cell according to embodiment 3 of the method as shown in FIG. 1.

FIG. 4 is a schematic diagram of situation for setting the Mute PHY Frame when a TDD 4:4 cell is adjacent to a TDD 6:2 cell according to embodiment 3 of the method; wherein the two adjacent cells are a cell using the TDD 6:2 mode and a cell using the TDD 4:4 mode. As shown in FIG. 4, the first physical frame of the uplink transmission block of the TDD 4:4 overlaps with the fifth physical frame of the downlink transmission block of the TDD 6:2, and the second physical frame of the uplink transmission block of the TDD 4:4 overlaps with the sixth physical frame of the downlink transmission block of the TDD 6:2.

In this situation, to eliminate the interference, for the overlapped physical frames, one or two physical frames of the fifth downlink physical frame of a downlink transmission block of the cell using the TDD 6:2 mode and the first uplink physical frame of an uplink transmission block of the cell using the TDD 4:4 mode are set not to transmit signals (Mute PHY Frame); one or two physical frames of the sixth downlink physical frame of the downlink transmission block of the cell using the TDD 6:2 mode and the second uplink physical frame of the uplink transmission block of the cell using TDD 4:4 mode are set not to transmit signals.

In this embodiment, preferably, to simplify the operation process of the system, the first physical frames of all the uplink transmission blocks of the TDD 4:4 may be set as the Mute PHY Frame, the sixth physical frames of all the downlink transmission blocks of the TDD 6:2 are set as the Mute PHY Frame at the same time. In this way, two transmission modes of the TDD 4:3 and the TDD 5:2 appears, the system only add the process of the two transmission modes of the TDD 4:3 and the TDD 5:2, and the complexity of system processing is reduced.

With this embodiment, the cell interference may be eliminated when the TDD 4:4 cell is adjacent to the TDD 6:2 cell.

Embodiment 4

A TDD 5:3 Cell is Adjacent to a TDD 3:5 Cell

Figure 5:
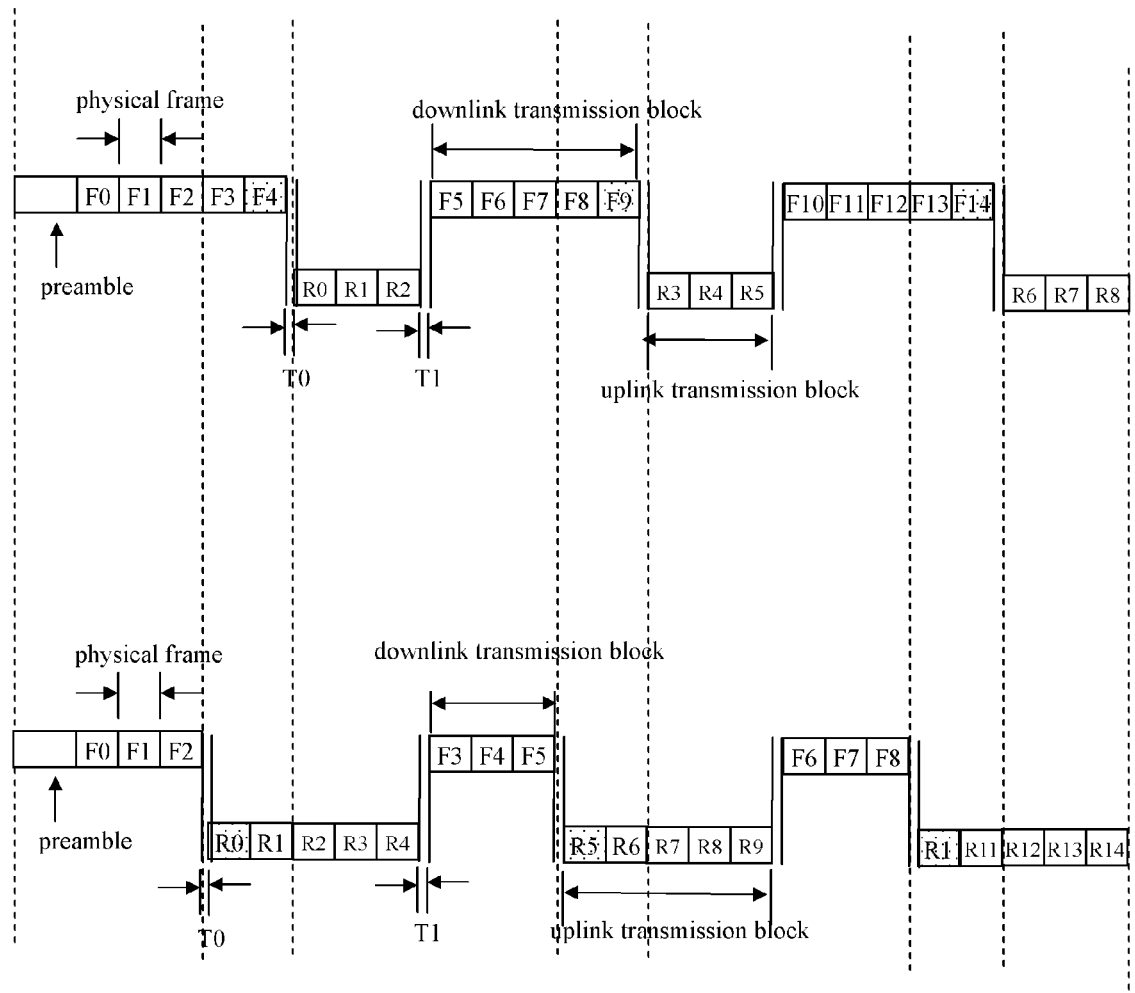
FIG. 5 is a schematic diagram of situation for setting the Mute PHY Frame e when a TDD 5:3 cell is adjacent to a TDD 3:5 cell according to embodiment 4 of the method as shown in FIG. 1.

FIG. 5 is a schematic diagram of situation for setting the Mute PHY Frame e when a TDD 5:3 cell is adjacent to a TDD 3:5 cell according to embodiment 4 of the method, wherein the two adjacent cells are a cell using the TDD 5:3 mode and a cell using the TDD 3:5 mode. As shown in FIG. 5, the fourth physical frame of the downlink transmission block of the TDD 5:3 overlaps with the first physical frame of the uplink transmission block of the TDD 3:5, and the fifth physical frame of the downlink transmission block of the TDD 5:3 overlaps with the second physical frame of the uplink transmission block of the TDD 3:5.

In this situation, to eliminate the interference, for the overlapped physical frames, one or two physical frames of the fourth downlink physical frame of a downlink transmission blocks of the cell using the TDD 5:3 mode and the first uplink physical frame of an uplink transmission block of the cell using the TDD 3:5 mode are set not to transmit signals; one or two physical frames of the fifth downlink physical frame of the downlink transmission block of the cell using the TDD 5:3 mode and the second uplink physical frame of the uplink transmission block of the cell using the TDD 3:5 mode are set not to transmit signals.

Preferably, to simplify the operation process of the system, the fifth physical frames of all the downlink transmission blocks of TDD 5:3 may be set as the Mute PHY Frame, and the first physical frames of all the uplink transmission blocks of the TDD 3:5 are set as the Mute PHY Frame. In this way, two transmission modes of the TDD 4:3 and the TDD 3:4 appear, the system only add the process of the two transmission modes of the TDD 4:3 and the TDD, and the complexity of system processing is reduced.

With this embodiment, the cell interference may be eliminated when the TDD 5:3 cell is adjacent to the TDD 3:5 cell.

Embodiment 5

A TDD 5:3 Cell is Adjacent to a TDD 6:2 Cell

Figure 6:
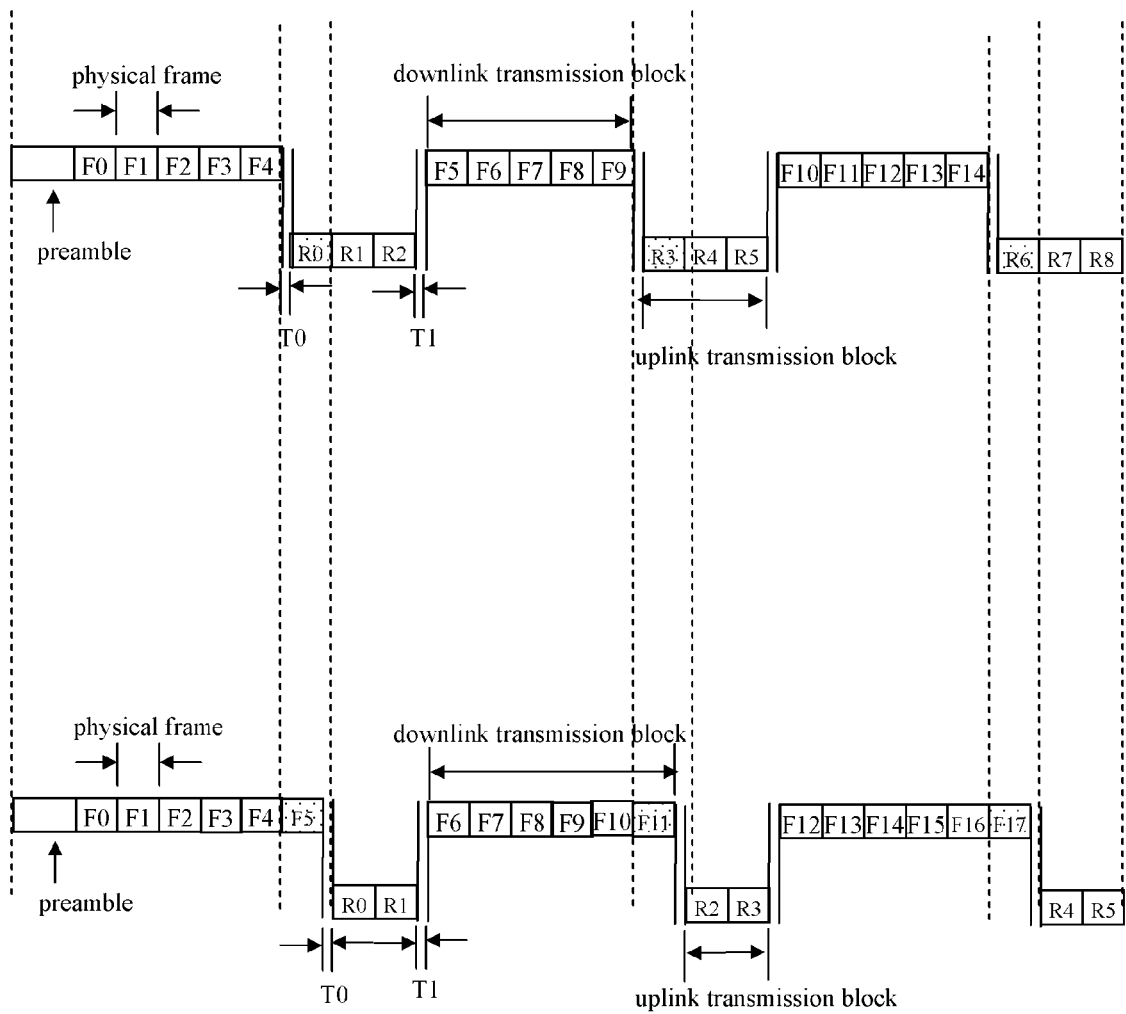
FIG. 6 is a schematic diagram of situation for setting the Mute PHY Frame when a TDD 5:3 cell is adjacent to a TDD 6:2 cell according to embodiment 5 of the method as shown in FIG. 1.

FIG. 6 is a schematic diagram of situation for setting the Mute PHY Frame when a TDD 5:3 cell is adjacent to a TDD 6:2 cell according to embodiment 5 of the method, wherein the two adjacent cells are a cell using the TDD 5:3 mode and a cell using the TDD 6:2 mode. As shown in FIG. 6, the first physical frame of the uplink transmission block of the TDD 5:3 overlaps with the sixth physical frame of the downlink transmission block of the TDD 6:2.

In this situation, to eliminate the interference, for the overlapped physical frames, the first uplink physical frame of the uplink transmission block of the cell using the TDD 5:3 mode is set not to transmit signals; or the sixth downlink physical frame of the downlink transmission block of the cell using the TDD 6:2 mode is set not to transmit signals; or the first uplink physical frame of the uplink transmission block of the cell using the TDD 5:3 mode and the sixth downlink physical frame of the downlink transmission block of the cell using the TDD 6:2 mode are set not to transmit signals at the same time.

Preferably, to simplify the operation processing of the system, the first physical frames of all the uplink transmission blocks of the TDD 5:3 are set as the Mute PHY Frame, or the sixth physical frames of all the downlink transmission blocks of the TDD 6:2 are set as the Mute PHY Frame. In this way, one transmission mode of the TDD 5:2 appears, the system only add the processing of one transmission mode of the TDD 5:2, and the complexity of system processing is reduced.

With this embodiment, the cell interference may be eliminated when the TDD 5:3 cell is adjacent to the TDD 6:2 cell.

Embodiment 6

A TDD 6:2 Cell is Adjacent to a TDD 3:5 Cell

Figure 7:
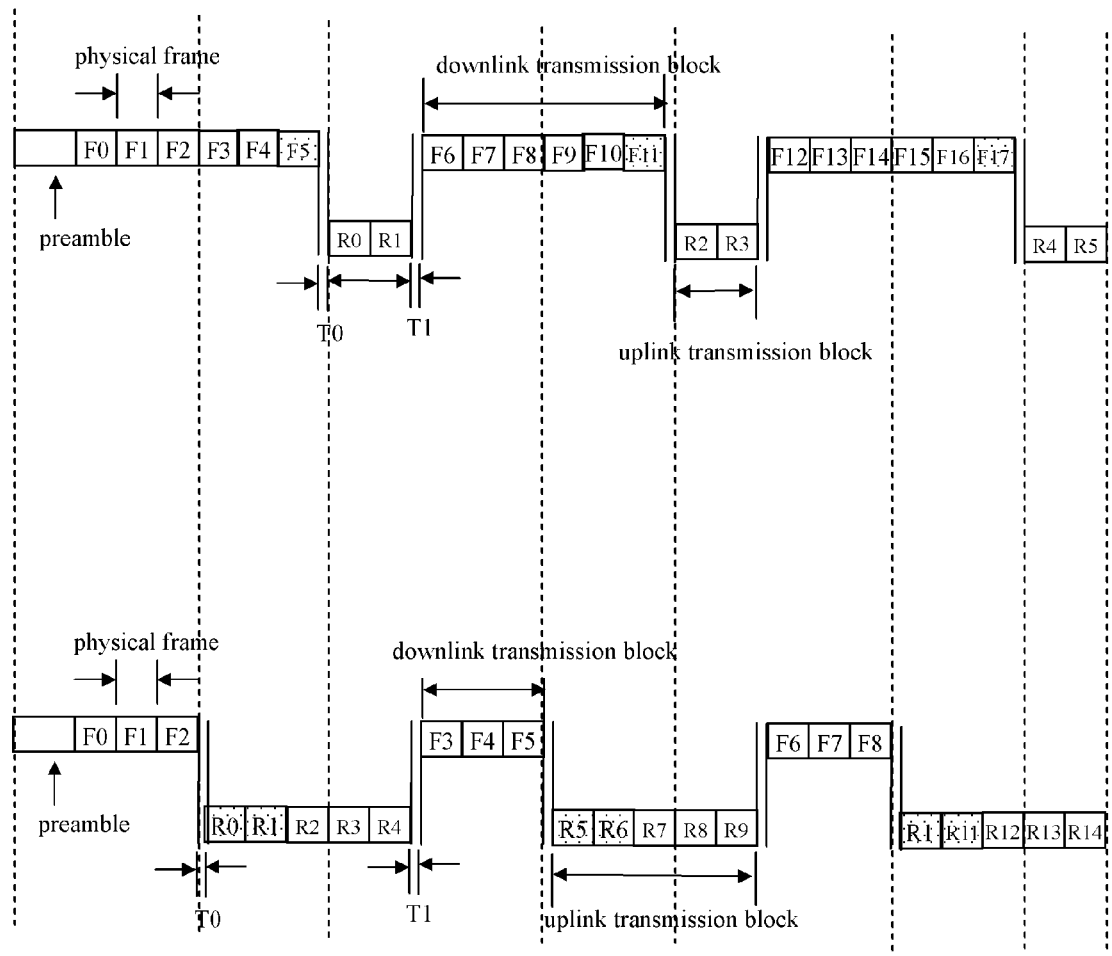
FIG. 7 is a schematic diagram of situation for setting the Mute PHY Frame when a TDD 6:2 cell is adjacent to a TDD 3:5 cell according to embodiment 6 of the method as shown in FIG. 1.

FIG. 7 is a schematic diagram of situation for setting the Mute PHY Frame when a TDD 6:2 cell is adjacent to a TDD 3:5 cell according to embodiment 6 of the method, wherein the two adjacent cells are a cell using the TDD 6:2 mode and a cell using the TDD 3:5 mode. As shown in FIG. 7, the fourth physical frame of the downlink transmission block of the TDD 6:2 overlaps with the first physical frame of the uplink transmission block of the TDD 3:5, and the fifth physical frame of the downlink transmission block of the TDD 6:2 overlaps with the second physical frame of the uplink transmission block of the TDD 3:5; moreover, the sixth physical frame of the downlink transmission block of the TDD 6:2 overlaps with the third physical frame of the uplink transmission block of the TDD 3:5.

In this situation, to eliminate the interference, for the overlapped physical frames, one or two physical frames of the fourth downlink physical frame of the downlink transmission block of the cell using the TDD 6:2 mode and the first uplink physical frame of the uplink transmission block of the cell using the TDD 3:5 mode are set not to transmit signals; one or two physical frames of the fifth downlink physical frame of the downlink transmission block of the cell using the TDD 6:2 mode and the second uplink physical frame of the uplink transmission block of the cell using TDD 3:5 mode are set not to transmit signals; one or two physical frames of the sixth downlink physical frame of the downlink transmission block of the cell using the TDD 6:2 mode and the third uplink physical frame of the uplink transmission block of the cell using the TDD 3:5 mode are set not to transmit signals.

Preferably, to simplify the operation processing of the system, the sixth physical frames of all the downlink transmission blocks of the cell with the TDD 6:2 mode are set as the Mute PHY Frame, and the first and the second physical frames of all the uplink transmission blocks of the cell with the TDD 3:5 mode are set as the Mute PHY Frame. In this way, two transmission modes of the TDD 5:2 and the TDD 3:3 appear, the system only add the process of the two transmission modes of the TDD 5:2 and the TDD 3:3, and the complexity of system processing is reduced.

With this embodiment, the cell interference may be eliminated when the TDD 6:2 cell is adjacent to the TDD 3:5 cell.

With the embodiments given above, it is equivalent to that the system adds the process of the transmission modes of the TDD 4:3, TDD 3:4, TDD 5:2 or TDD 3:3. In practical networking, since the situation that a TDD 6:2 cell is adjacent to a TDD 3:5 cell exists rarely, the probability of the appearance of the TDD 3:3 is very small; in addition, the process of the TDD 3:3 mode is simple and is similar to that of the TDD 4:4 mode; therefore, with the preferred processing method proposed by the present invention, three transmission mode processing of the TDD 4:3, the TDD 3:4 and the TDD 5:2 are mainly added in the system to reduce the complexity of system processing.

What should be noted is that the processing modes of FIG. 4, FIG. 5, FIG. 6 and FIG. 7 are similar to the embodiments as shown in FIG. 2 and FIG. 3, which may reduce the complexity of the system processing, and the same and similar contents thereof are not repeated again.

In addition, the increasing order according to the ratios of the uplink/downlink physical frames is: the TDD 3:5, the TDD 4:4, the TDD 5:3 and the TDD 6:2. As can be seen from FIG. 2 to FIG. 7, when the difference between the TDD modes of the adjacent two sides is minimal, i.e. the difference of the ratios of the uplink/downlink physical frames is minimal; the physical frames overlapped in the uplink/downlink are also minimal.

For example, in FIG. 2, when a TDD 4:4 cell is adjacent to a TDD 5:3 cell, there are only 3 physical frame pairs with overlapped uplink/downlink physical frames in a superframe; in this way, in these two adjacent cells, it only needs that one of them uses the TDD 4:3 with physical frames which do not transmit signals; for the same reason, FIG. 3 and FIG. 6 have the same principle.

In FIG. 4, when a TDD 4:4 cell is adjacent to a TDD 6:2 cell, since a TDD 5:3 is between the TDD 4:4 and the TDD 6:2, there are 6 physical frame pairs with overlapped uplink/downlink physical frame in a superframe. In these two adjacent cells, it requires both a TDD 4:3 using the physical frames which do not transmit signals and another TDD 5:2 using the physical frames which do not transmit signals. Compared with FIG. 2, the situation of FIG. 4 wastes more physical resource and makes the system networking more complicated. For the same reason, FIG. 5 and FIG. 7 have the same principle. FIG. 7 is a more extreme situation, a TDD 4:4 and a TDD 5:3 are between the TDD 3:5 and the TDD 6:2; in the situation that there are 9 physical frame pairs with overlapped uplink/downlink physical frame in a superframe, more physical resources may be wasted.

Therefore, in the networking, what should be done is that the difference of the TDD Modes used by the adjacent areas is minimal, i.e., smooth transition is required for the change of the TDD mode in the whole network.

FIG. 8 shows 7 configuration situations needed to be processed by the whole UMB TDD network system, wherein the former four situations are the superframe structures of the TDD 4:4, the TDD 5:3, the TDD 6:2 and the TDD 3:5 in the situation of without the Mute PHY Frame; the later three situations are the superframe structures of the TDD 4:3, the TDD 3:4 and the TDD 5:2 in the situation that the Mute PHY Frame is set at the adjacent areas with minimal difference of the TDD mode. In addition, for the three situations using the adjacent areas with different TDD modes, since the difference of the TDD mode is relative large, they are not shown in FIG. 8.

As shown in FIG. 8, PHY Frame index from 00 to 23 represents 24 PHY Frames; "F" in the grid represents the location of the downlink PHY Frame; "R" in the grid represents the location of the uplink PHY Frame; an empty grid represents the location of the Mute PHY Frame. "SFP" represents a superframe preamble, and the "F" marked in the grids below represents that the superframe preamble is downlink.

Figure 9:
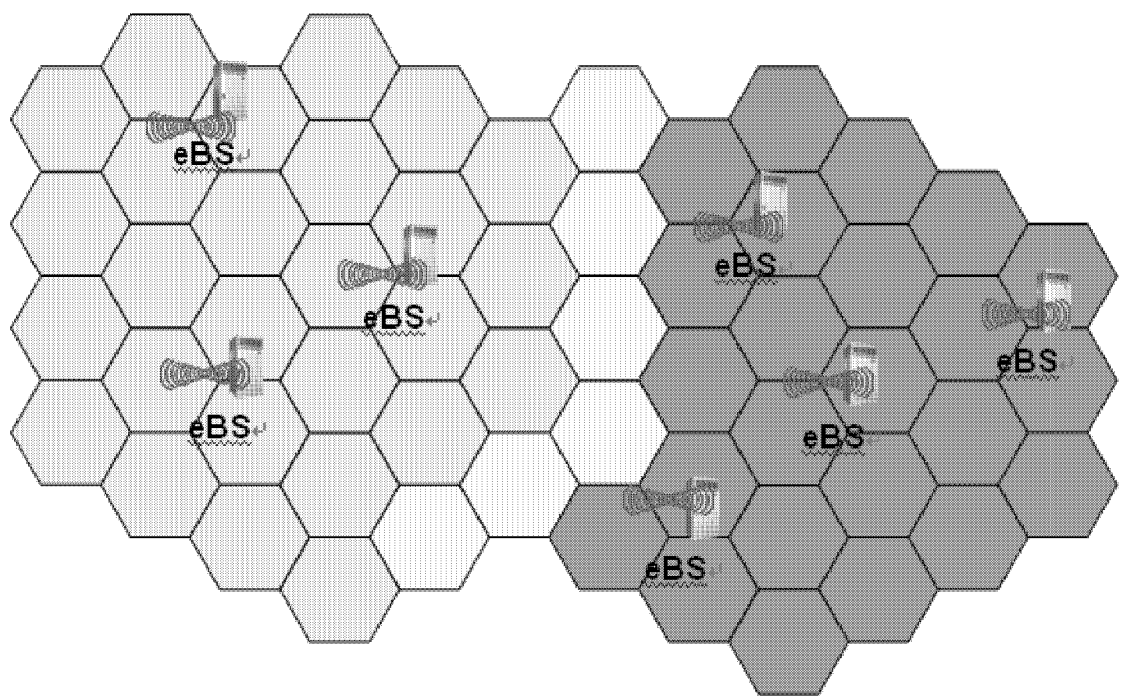
FIG. 9 is schematic diagram of the implementation effect according to method embodiment one of the present invention.

With the embodiments of the present invention, in the networking, when areas using different time division duplex modes are adjacent, a cell of the time division duplex mode with physical frames which do not transmit signals (Mute PHY Frame) may be used to divide the areas using different time division duplex modes; as shown in FIG. 9, assuming that the left side area is the TDD 4:4 and the right side area is the TDD 5:3, the Mute method needs to be used in the border cells of these two areas (which is also called border cell). To simplify the complexity of resource scheduling in the Mute method, the present invention introduces a middle area band of the TDD 4:3; when a terminal moves from the left side area to the right side area, it is equivalent to pass through the 3 configured systems of the TDD 4:4, the TDD 4:3 and the TDD 5:3 without passing through other complex steps, that is to say, when performing the UMB TDD networking, the TDD 4:3 area needs to be allocate between the TDD 4:4 area and the TDD 5:3 area; in this way, the interference problem of the uplink/downlink overlapped has been solved for the whole network system upon networking. For the same reason, no matter what kind of the TDD mode is used, it is necessary for performing the smooth transition of the change of the TDD mode in the whole network.

What should be noted is that it can be understood by those skilled in the art that the method of the embodiments of the present invention may also be applied to other TDD Modes, which is still included in the protection scope of the present invention.

To sum up, with the above embodiments, part or all of the physical frames overlapped in the time domain are made not to transmit signals, the uplink/downlink signal interference occurred when the ratios of the numbers of uplink/downlink physical frames between adjacent cells in the same frequency band is different may be avoided, and the complexity of resource scheduling of the Mute method is effectively reduced.

What is described above is the situation that the number of adjacent cells is two; the present invention may also be applied to the situation that the number of adjacent cells is more than two. The detailed technical scheme is given by the following embodiments.

Method Embodiment Two

According to an embodiment of the present invention, a method for configuring inter-cell time division duplex modes based on a TDD system is provided, which is used to eliminate the uplink/downlink signal interference between more than two adjacent cells with different ratios of the numbers of uplink/downlink physical frames in the same frequency band.

Figure 10:
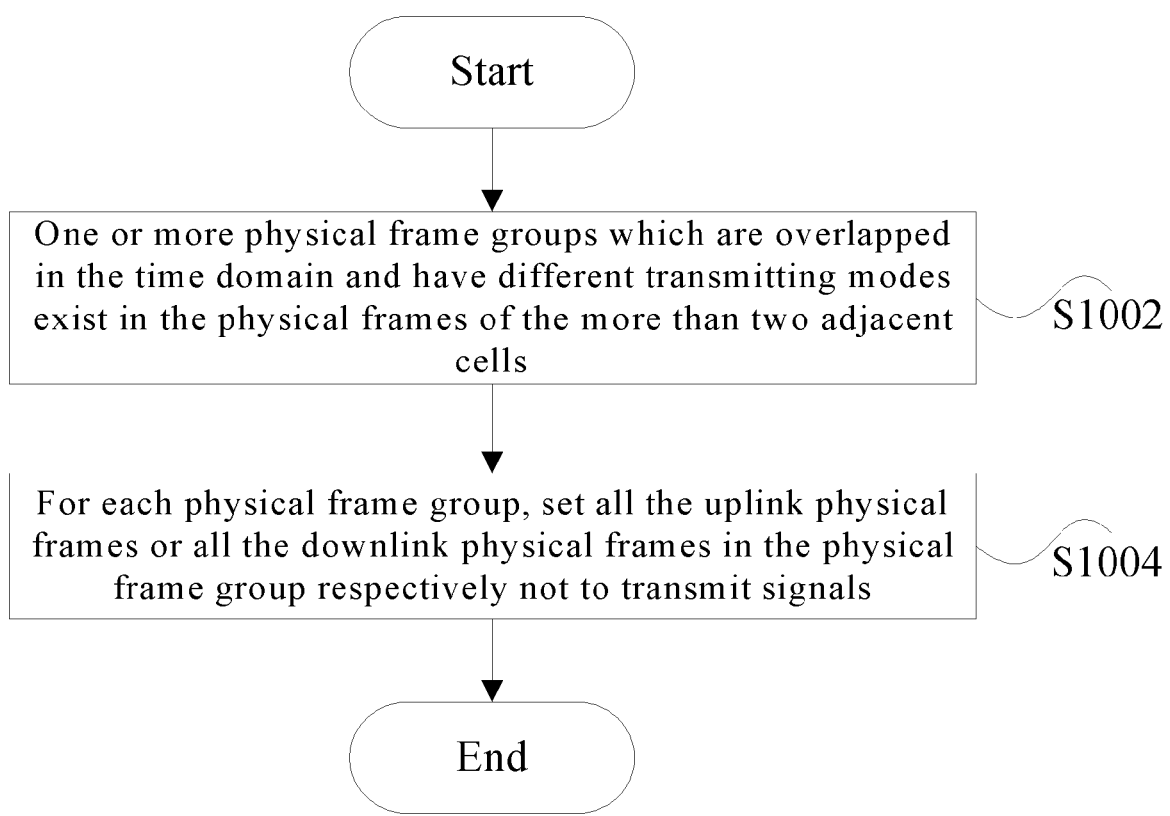
FIG. 10 is a flowchart of the method for configuring inter-cell time division duplex modes based on a TDD system according to method embodiment two of the present invention.

As shown in FIG. 10, the method for configuring inter-cell time division duplex modes according to the embodiment of the present invention includes the following processing (step S1002 to step S1004).

Step S1002, one or more physical frame groups which are overlapped in the time domain and have different transmitting modes exist in the physical frames of the more than two adjacent cells.

Step S1004, for each physical frame group, set all the uplink physical frames or all the downlink physical frames in the physical frame group respectively not to transmit signals, in the present text, the "PHY Frame which does not transmit signals" is called the Mute PHY Frame; in this way, the signal interference between the uplink and the downlink is avoided.

Wherein, similar to the method embodiment one, the lengths of the superframes in which the physical frames of the above more than two adjacent cells reside may be identical or different. In the situation of the lengths of the superframes are identical, the physical frame group is determined by aligning the heads and the tails of the superframes of various adjacent cells. The technical scheme provided by the method embodiment of the present invention may further be described with reference to the embodiments.

Embodiment 7

Figure 11:
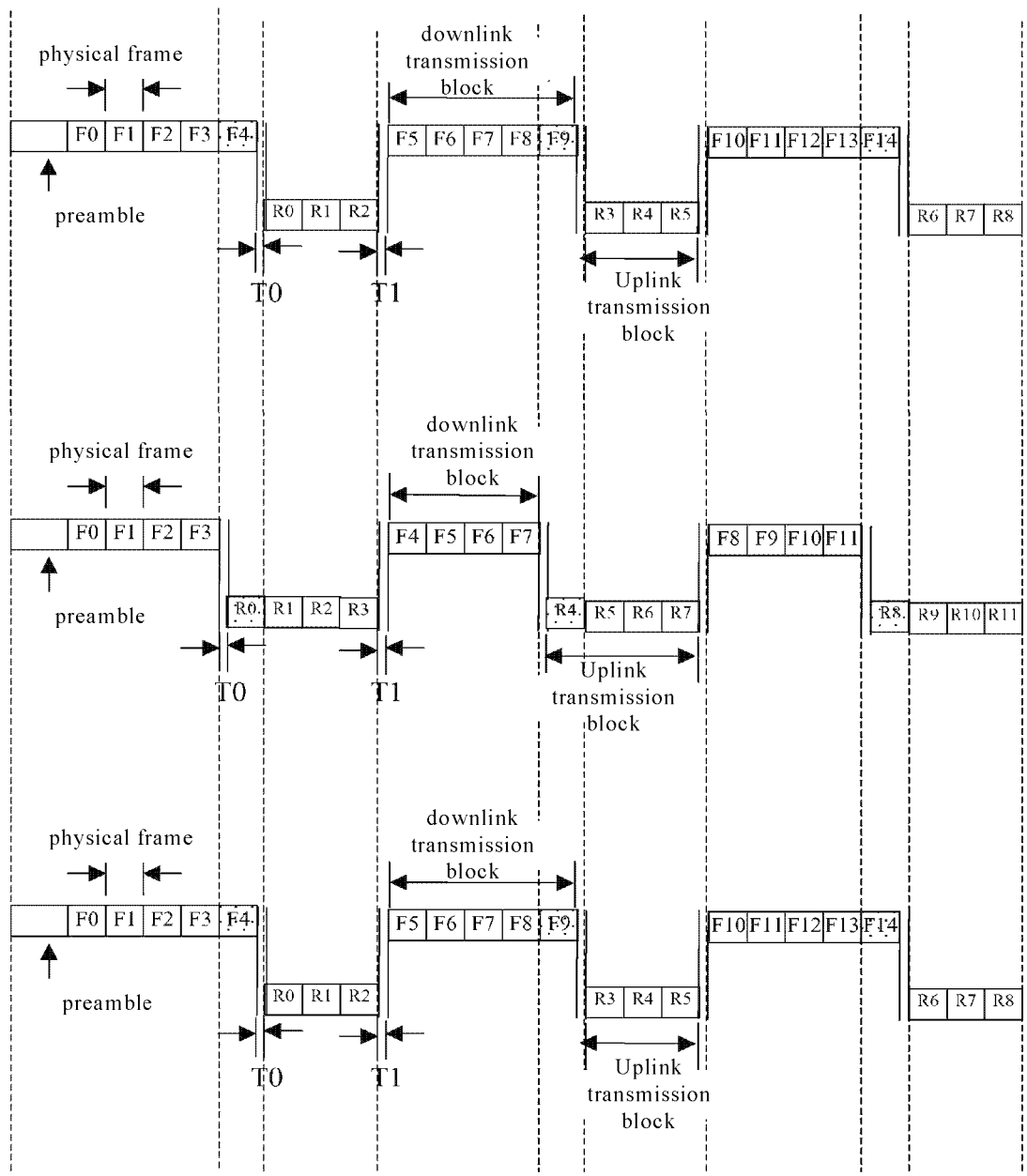
FIG. 11 is a schematic diagram of the embodiment 7 of the method as shown in FIG. 10.

To simplify the description, in this embodiment, assume that there are three adjacent cells, including cell 1, cell 2 and cell 3, with different ratios of the numbers of the uplink/downlink PHY Frames, and assume that the lengths of the superframes of the system are identical, which is shown in FIG. 11.

Assume that in the three adjacent cells, the TDD mode use by the cell 1 is 5:3, the TDD mode used by the cell 2 is 4:4, and the TDD mode used by the cell 3 is 5:3; as shown in FIG. 11, in a superframe, F4, F9 and F14 (cell 1) of the downlink PHY Frame of the TDD 5:3 mode are respectively overlapped with R0, R4 and R8 (cell 2) of the uplink PHY Frame of the TDD 4:4 mode and F4, F9 and F14 (cell 3) of another downlink PHY Frame of the TDD 5:3 in the time domain; in this way, there is the interference between the downlink signals of the TDD 5:3 mode and the uplink signals of the TDD 4:4 mode.

To eliminate the interference, the F4 physical frame (cell 1) of the TDD 5:3 mode and the F4 physical frame (cell 3) of the TDD 5:3 mode or the R0 physical frame of the TDD 4:4 mode may be made to not transmit signals; in particular, if the two F4 physical frames of the TDD 5:3 mode are made to not transmit signals, the R0 physical frame of the TDD 4:4 mode may transmit signals or not transmit signals; if the R0 physical frame of the TDD 4:4 mode is made to not transmit signals, the two F4 physical frames of the TDD 5:3 mode may transmit signals or not transmit signals; to sum up, the two F4 physical frames of the TDD 5:3 mode and the R0 physical frame of the TDD 4:4 mode can not transmit signals at the same time. In other words, in the embodiment of the present invention, the two F4 physical frames of the TDD 5:3 mode or the R0 physical frame of the TDD 4:4 mode is made to use the Mute PHY Frame mode. In this way, there is no signal interference between the two F4 physical frames of the TDD 5:3 mode and the R0 physical frame of the TDD 4:4 mode.

For the same reason, to avoid interference, the two F9 physical frames of the TDD 5:3 mode or the R4 physical frame of the TDD 4:4 may be made to not transmit signals; and/or the two F14 physical frames of the TDD 5:3 mode or the R8 physical frame of the TDD 4:4 does not transmit signals.

The present invention may also applicable to the situation that the lengths of the superframes of various adjacent cells are different. I.e., as long as an uplink physical frame is overlapped with a downlink physical frame in the time domain, all the uplink physical frames or all the downlink physical frames are set to use the Mute PHY Frame mode.

The interference eliminating method in the situation that the ratios of the numbers of the uplink/downlink physical frame of the adjacent cells is different is described hereinabove; practically, no matter whether the ratios of the numbers of the uplink/downlink physical frame of the adjacent cells is identical, the interference may occur in the above situation that the superframes of the adjacent cells are not aligned. The detailed technical scheme may be further given by the following embodiments.

Method Embodiment Three

According to an embodiment of the present invention, a method for configuring inter-cell time division duplex modes based on a TDD system is provided, which is used to eliminate the uplink/downlink signal interference between multiple adjacent cells, of which the head and tail of the superframes in the same frequency band are not aligned, the ratios of the numbers of the uplink/downlink physical frames between the multiple adjacent cells may be identical or different, and the lengths of the superframes of the adjacent cells may be identical or different.

Figure 12:
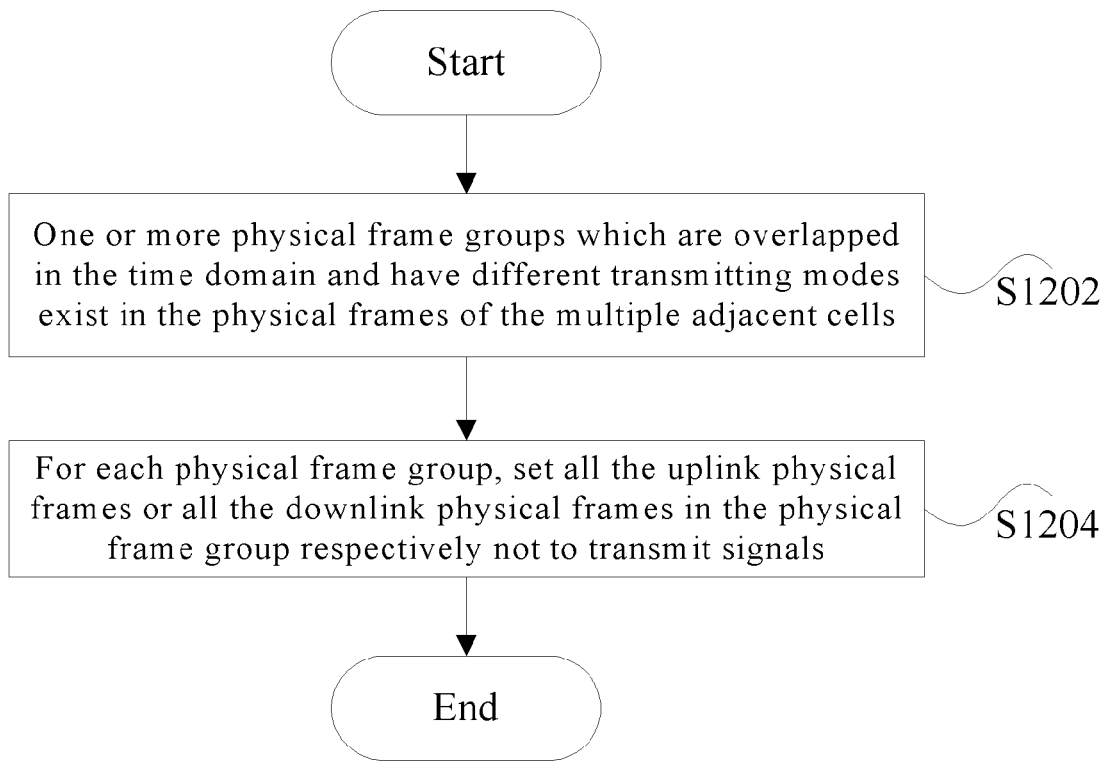
FIG. 12 is a flowchart of the method for configuring inter-cell time division duplex modes based on a TDD system according to method embodiment three of the present invention.

As shown in FIG. 12, the method for configuring inter-cell time division duplex modes based on a TDD system according to the embodiment of the present invention includes the following process. (step S1202 to step S1204).

Step S1202, one or more physical frame groups which are overlapped in the time domain and have different transmitting modes exist in the physical frames of the multiple adjacent cells.

Step S1204, for each physical frame group, set all the uplink physical frames (may be one or more) or all the downlink physical frames (may be one or more) in the physical frame group respectively not to transmit signals.

With the technical scheme provided by this embodiment, the uplink/downlink interference caused by the non-alignment of the head and the tail of the superframes between the adjacent cells in the same frequency band may be avoided.

Method Embodiment Four

According to an embodiment of the present invention, a method for configuring inter-cell time division duplex modes based on a time division duplex system is provided, the method includes: when different time division duplex modes are used for networking in adjacent areas, the difference between the TDD modes used by the adjacent areas is made to be minimal; wherein the difference between the TDD modes used by the adjacent areas is made to be minimal refers to: the numbers of physical frames of downlink transmission blocks of the adjacent cells are the same and the difference of the numbers of the physical frames of uplink transmission blocks is one; or the numbers of physical frames of uplink transmission blocks of the adjacent cells are the same and the difference of the numbers of the physical frames of downlink transmission blocks is one.

Device Embodiment

According to an embodiment of the present invention, a device for configuring inter-cell time division duplex modes based on a TDD system is provided, which is used to eliminate the uplink/downlink signal interference between multiple adjacent cells in the same frequency band, wherein the interference includes the interference caused by the different ratios of the numbers of the uplink/downlink physical frame and other interference caused by the non-alignment of the head and the tail of the superframe.

Figure 13:
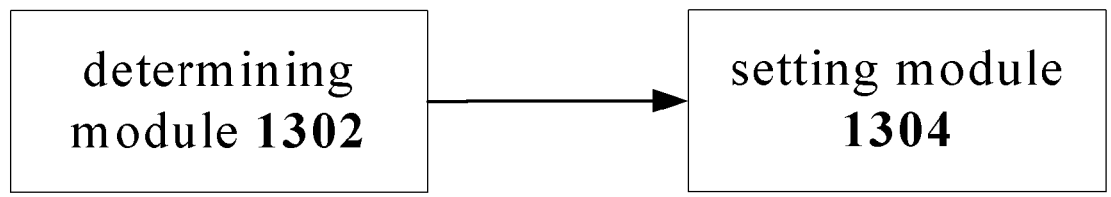
FIG. 13 is a structure block diagram of the device for configuring inter-cell time division duplex modes based on a time division duplex system according to the device embodiment of the present invention.

FIG. 13 is a structure block diagram of the device for configuring inter-cell time division duplex modes based on a TDD system according to the device embodiment of the present invention As shown in FIG. 13, the device includes: a determining module 1302, configured to determine that one or more physical frame groups which are overlapped in the time domain and have different transmitting modes exist in physical frames of the multiple adjacent cells; a setting module 1304 connected to the a determining module 1302, configured to set, for each physical frame group, all the uplink physical frames (may be one or more) or all the downlink physical frames (may be one or more) in the physical frame group respectively not to transmit signals Multiple details of this embodiment may be understood with reference to the method embodiment provided above, the same or similar content will not be repeated again herein.

As described above, with the above one or more technical schemes provided by the embodiments of the present invention, by means of making the uplink physical frame and the downlink physical frame not to transmit signals at the same time, the uplink/downlink signal interference occurred when the ratios of the numbers of uplink/downlink physical frames between adjacent cells in the same frequency band is different is avoided, the uplink/downlink signal interference caused by the non-alignment of the head and tail of the superframes of the adjacent cells in the same frequency band is avoided, and the defects of the technical problem in the related art is overcome.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for configuring inter-cell time division duplex modes based on a time division duplex system, comprising: one or more physical frame pairs, which are configured to be transmitted in overlapped transmission periods in the time domain and have different transmitting modes, existing in physical frames of two adjacent cells; for each physical frame pair, setting only one physical frames of the physical frame pair not to transmit signals; in all the physical frame pairs, setting all uplink physical frames at a same location not to transmit signals, or setting all downlink physical frames at a same location not to transmit signals; wherein in the situation of setting an uplink physical frame not to transmit signals in an uplink transmission block, the same settings are performed to the uplink physical frames at the same location in other uplink transmission blocks; in the situation of setting a downlink physical frame not to transmit signals in a downlink transmission block, the same settings are performed to the downlink physical frames at the same location in other downlink transmission blocks.

2. The method according to claim 1, wherein the two adjacent cells are a cell using a TDD 5:3 mode and a cell using a TDD 4:4 mode; the fifth downlink physical frames of all the downlink transmission blocks of the cell using the TDD 5:3 mode are set not to transmit signals; or the first uplink physical frames of all the uplink transmission blocks of the cell using the TDD 4:4 mode are set not to transmit signals.

3. The method according to claim 1, wherein the two adjacent cells are a cell using a TDD 3:5 mode and a cell using a TDD 4:4 mode; the first uplink physical frames of all the uplink transmission blocks of the cell using the TDD 3:5 mode are set not to transmit signals; or the fourth downlink physical frames of all the downlink transmission blocks of the cell using the TDD 4:4 mode are set not to transmit signals.

4. The method according to claim 1, wherein the two adjacent cells are a cell using a TDD 6:2 mode and a cell using a TDD 4:4 mode; the sixth downlink physical frames of all the downlink transmission blocks of the cell using the TDD 6:2 mode and the first uplink physical frames of all the uplink transmission blocks of the cell using the TDD 4:4 mode are set not to transmit signals.

5. The method according to claim 1, wherein the two adjacent cells are a cell using a TDD 5:3 mode and a cell using a TDD 3:5 mode; the fifth downlink physical frames of all the downlink transmission blocks of the cell using the TDD 5:3 mode and the first uplink physical frames of all the uplink transmission blocks of the cell using the TDD 3:5 mode are set not to transmit signals.

6. The method according to claim 1, wherein the two adjacent cells are a cell using a TDD 5:3 mode and a cell using a TDD 6:2 mode; the first uplink physical frames of all the uplink transmission blocks of the cell using the TDD 5:3 mode or the sixth downlink physical frames of all the downlink transmission blocks of the cell with TDD 6:2 mode are set not to transmit signals.

7. The method according to claim 1, wherein the two adjacent cells are a cell using a TDD 6:2 mode and a cell using a TDD 3:5 mode; the sixth downlink physical frames of all the downlink transmission blocks of the cell using the TDD 6:2 mode and the first and the second uplink physical frames of all the uplink transmission blocks of the cell using the TDD 3:5 mode are set not to transmit signals.

8. The method according to claim 1, wherein when areas using different time division duplex modes are adjacent, one or more cells of the time division duplex mode with physical frames which do not transmit signals is used to divide the areas using different time division duplex modes.

9. The method according to claim 1, wherein the lengths of the superframes in which physical frames of the two adjacent cells reside are identical or different; in the situation that the lengths of the superframes in which the physical frames of the two adjacent cells reside are identical, the physical frame pair is determined by aligning the head and the tail of the superframes of the two adjacent cells in the time domain.

10. The method according to claim 1, wherein the head and the tail of the superframes in which physical frames of the two adjacent cells reside are aligned or not aligned.

11. A method for configuring inter-cell time division duplex modes based on a time division duplex system, which is used to eliminate the uplink/downlink signal interference between more than two adjacent cells with different ratios of the numbers of uplink/downlink physical frames in the same frequency band, comprising: one or more physical frame groups, which are configured to be transmitted in overlapped transmission periods in the time domain and have different transmitting modes, existing in the physical frames of the more than two adjacent cells; for each physical frame group, setting all the uplink physical frames or all the downlink physical frames in the physical frame group respectively not to transmit signals; in all the physical frame groups, setting all the uplink physical frames in the physical frame groups at a same location not to transmit signals, or setting all the downlink physical frames in the physical frame groups at a same location not to transmit signals; wherein in the situation of setting an uplink physical frame not to transmit signals in an uplink transmission block, the same settings are performed to the uplink physical frames at the same location in other uplink transmission blocks; in the situation of setting a downlink physical frame not to transmit signals in a downlink transmission block, the same settings are performed to the downlink physical frames at the same location in other downlink transmission blocks.

12. The method according to claim 11, wherein the lengths of the superframes in which the physical frames of the more than two adjacent cells reside are identical or different; in the situation that the lengths of the superframes in which the physical frames of the more than two adjacent cells reside are identical, the physical frame group is determined by aligning the heads and the tails of the superframes of various adjacent cells in the time domain.

13. A method for configuring inter-cell time division duplex modes based on a time division duplex system, which is used to eliminate the uplink/downlink signal interference between multiple adjacent cells, of which the head and tail of the superframes in the same frequency band are not aligned, comprising: one or more physical frame groups, which are configured to be transmitted in overlapped transmission periods in the time domain and have different transmitting modes, existing in the physical frames of the multiple adjacent cells;

for each physical frame group, setting all the uplink physical frames or all the downlink physical frames in the physical frame group respectively not to transmit signals; in all the physical frame groups, setting all the uplink physical frames in the physical frame groups at a same location not to transmit signals, or setting all the downlink physical frames in the physical frame groups at a same location not to transmit signals; wherein in the situation of setting an uplink physical frame not to transmit signals in an uplink transmission block, the same settings are performed to the uplink physical frames at the same location in other uplink transmission blocks; in the situation of setting a downlink physical frame not to transmit signals in a downlink transmission block, the same settings are performed to the downlink physical frames at the same location in other downlink transmission blocks.

14. The method according to claim 13, wherein the ratios of the numbers of the uplink/downlink physical frames between the multiple adjacent cells are identical, or the ratios of the numbers of the uplink/downlink physical frames between the multiple adjacent cells are different.

15. A device for configuring inter-cell time division duplex modes based on a time division duplex system, which is used to eliminate the uplink/downlink signal interference between multiple adjacent cells in the same frequency band, comprising: a determining module, configured to determine that one or more physical frame groups, which are configured to be transmitted in overlapped transmission periods in the time domain and have different transmitting modes, exist in physical frames of the multiple adjacent cells; a setting module, configured to set, in all the physical frame groups, all the uplink physical frames in the physical frame groups at a same location not to transmit signals or all the downlink physical frames in the physical frame groups at a same location not to transmit signals; wherein in the situation of setting an uplink physical frame not to transmit signals in an uplink transmission block, the same settings are performed to the uplink physical frames at the same location in other uplink transmission blocks; in the situation of setting a downlink physical frame not to transmit signals in a downlink transmission block, the same settings are performed to the downlink physical frames at the same location in other downlink transmission blocks.

\* \* \* \* \*